Mar. 3, 1925.
H. S. SWEET
1,528,514
FLUID PRESSURE BRAKE FOR ELECTRIC CARS
Filed Jan. 24, 1923
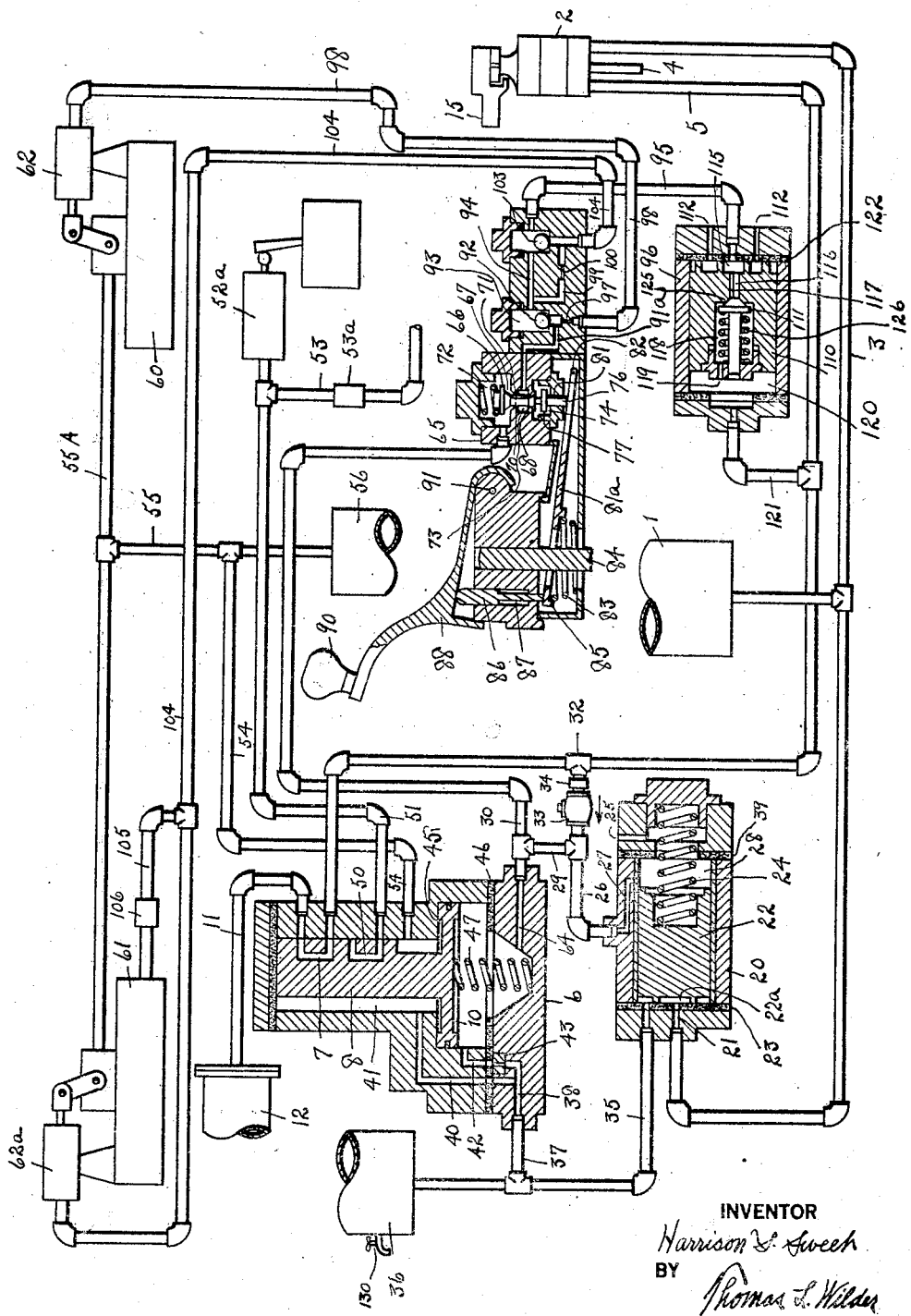
INVENTOR
Harrison S. Sweet
BY
Thomas L. Wilder
ATTORNEY Patented Mar. 3, 1925.

1,528,514

UNITED STATES PATENT OFFICE.

HARRISON S. SWEET, OF UTICA, NEW YORK.

FLUID-PRESSURE BRAKE FOR ELECTRIC CARS.

Application filed January 24, 1923. Serial No. 614,691.

*To all whom it may concern:*

Be it known that I, HARRISON S. SWEET, a citizen of the United States, residing at Utica, in the county of Oneida and State of New York, have invented certain new and useful Improvements in Fluid-Pressure Brakes for Electric Cars, of which the following is a specification, reference being had therein to the accompanying drawing.

My invention relates to a fluid pressure brake for electric cars, and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to add an air conserving device to a safety brake equipment which applies the brakes automatically when manual pressure is removed from the electric power controller handle as described in my former application filed in the United States Patent Office, January 13, 1922, and numbered serially 528,894.

Heretofore, in safety control systems using compressed air, it was necessary to build up the brake cylinder pressure to main reservoir pressure upon opening the air operated doors of the car. This old manner of applying the brakes consumes more compressed air than is necessary for the reason that in the ordinary braking of the car there is a relatively small pressure in the brake cylinder when the car is brought to a stop. For safe operation, however, it is necessary only to have a predetermined pressure in brake cylinder when the car is stopped. This pressure does not have to be equal to main reservoir pressure. Therefore, in this system the pressure in the brake cylinder is built up and maintained, when car has come to a stop, to some predetermined pressure which is considerably less than main reservoir pressure, although sufficient to hold car stationary. Such a predetermined pressure is adapted to a quicker release of the brakes, owing to the lower pressure in the brake cylinder than would be the case, as heretofore, where the pressure in the brake cylinder is built up to main reservoir pressure.

Furthermore, this reduction of pressure in the brake cylinder saves not only in pressure of air in said cylinder but also in the volume of air in brake cylinder, thereby economizing in air pressure used at each regular stop of the car at which it is necessary to open the doors for the egress and ingress of passengers.

Moreover, the decrease in pressure of air in brake cylinder, reduces the travel of the piston in the brake cylinder, whereby there results less wear on the brake rigging.

Furthermore, the system allows the car to be operated independently of the emergency brake and door control features until pressure is built up in main reservoir to a predetermined degree, after which, the emergency brake and door operating mechanisms are automatically cut in. In the event the main reservoir pressure of the system falls below the predetermined degree, the brakes will be applied automatically, the power cut off, rails sanded and the doors balanced.

The object will be understood by referring to the drawings in which the figure represents a diagrammatic view of the device, showing parts in section and other parts in elevation.

Referring more particularly to the drawings, the main reservoir 1 is connected to the well known motorman's brake valve 2 by pipe 3. Valve 2 has leading therefrom exhaust pipe 4 that opens to atmosphere and straight air pipe 5. Pipe 5 connects with emergency valve casing 6 and is adapted to be united by port 7 formed in the upper part 8 of movable piston valve 10 to pipe 11 that leads to brake cylinder 12. The turning of handle 15 to release position or to the left of center, as shown, will close main reservoir pipe 3 and connects straight air pipe 5 to pipe 4, whereby to exhaust brake cylinder 12 to atmosphere in order to release the brakes. When handle 15 is in center or lap position, pipes 3, 4 and 5 are closed. However, when handle 15 is to the right of center or application position, main reservoir pipe 3 is connected to pipe 5 and pipe 4 is closed, whereby a direct application of the air brakes can be effected, provided piston valve 10 is in up position as illustrated in the figure.

Main reservoir pipe 3 is connected also to protection valve casing 20 at port 21. Said protection valve embodies movable piston valve 22 having an open chamber at $22^a$ and is held against seat 23 by coiled spring 24. In this position of piston valve 22, port 21 is closed and port 27 is vented to atmosphere through port 25, whereby to exhaust pipe 26 connected to casing 20 by way of port 27 that leads to the interior 28 of casing 20. Pipe 26 is united to cross pipe 29 that joins with pipe 30 leading to emergency valve casing 6. Pipe 26 is united also to straight air pipe 5 at 32, there being interposed a one way recharge check valve 33 and a reducing bushing 34.

Protection valve casing 20 is connected by pipe 35 with emergency tank reservoir 36. Pipe 37 leads from pipe 35 to port 38 formed in emergency valve casing 6. Pipe 3 will be connected to pipe 35 and emergency reservoir 36 when the pressure entering chamber 22$^a$ at port 21 reaches a predetermined degree at which spring 24 will yield. In this event piston valve 22 will be forced against the tension of said spring 24 off from seat 23 to seat 39. In this position of valve 22, port 27 of casing 20 will be closed to prevent the further exhaustion of pipe 26.

The emergency valve embodies the aforesaid casing 6 having a port 40 that leads from port 38 to the chamber 41 above piston valve 10 and a port 42 that leads from said port 38 to chamber 41 below piston valve 10 when in up position. A reducing bushing 43 which is made removable to allow for varying the size of the aperture is inserted in line with port 42.

When emergency piston valve 10 is in up position, as shown in full lines, pipe 5 is connected to pipe 11 of brake cylinder 12 by means of port 7, whereby to permit a direct application or release of the brakes, in accordance with the position of handle 15. Moreover, pipe 51 will be closed and pipe 54 leading to tank 56 is connected to chamber 41 to supply air pressure to operate front door engine 60 and rear door engine 61, which, in turn, actuate the respective doors of the car, as more fully explained in said former application.

When piston valve 10 is forced off valve stop 45 to lower position on seat 46, by an excess of compressed air in chamber 41 above piston valve 10, and against the tension of spring 47, port 42 will open into chamber 41 above piston valve 10. In this latter position of valve 10, pipe 30 will be shut off. Port 50, formed in the upper part 8 of movable piston valve 10, will connect also in this latter or down position of valve 10, pipe 51, which leads to electric circuit knock off engine 52$^a$ and pipe 53 having reducing bushing 53$^a$ therein to sander, not shown, and pipe 54 that leads to pipe 55 to reservoir tank 56 adapted to actuate said electric circuit knock off engine 52$^a$ and sander, not shown. Therefore, in this lower position of piston valve 10, the ports would be in condition to allow the compressed air to effect an emergency application of the brakes as well as to actuate the electric circuit knock off engine 52$^a$ to off position and to actuate the sander, not shown.

The lower part of chamber 41 is connected by a port 64 to pipe 30 that runs to the pilot valve casing 65 containing a valve 66. Valve 66 embodies seats 67 and 68 connected by a shaft 70 having a longitudinal groove 71 therein for the escape of compressed air from chamber 72 to chamber 73, when valve 66 is in open position. A plunger 76 having a shoulder 77 makes contact with the lower surface of valve 66. Said plunger 76 has a groove 81 formed therein for the passage of compressed air to atmosphere at all times. Plunger 76 is adapted to rest upon the upper surface of lever 81$^a$, as shown and described in said former application, which lever 81$^a$ is fulcrumed at 82. The free end of lever 81$^a$ is held elevated by a conically wound coiled spring 83 that is disposed about shaft 84 and rests between the upper surface of casing 65 of the pilot valve and the lower surface of lever 81$^a$ that is equipped with a flange 85 for retaining spring 83 in position. A shouldered pin 86 is mounted to move freely in a correspondingly formed recess 87 in casing 65. The lower end of pin 86 rests on the upper surface of lever 81$^a$, which holds pin 86 in elevated position. The upper end of pin 86, however, rests against the lower surface of controller handle casing 88 and, thereby, holds the handle 90 yieldingly in elevated position. Said casing 88 is fulcrumed to swing on rod 91 supported on casing 65. When handle 90 is in elevated position, valve seat 67 will be unseated and allow compressed air to pass from chamber 72 to chamber 73 and thence through a port 91$^a$ to the under side of ball valve 92 to chamber 93 thereabove, port 94 to pipe 95 to valve casing 96. Compressed air will flow also though in a smaller quantity because of reduced passageway 97 to pipe 98 to front door engine operator 62, whereby to actuate the front door to open position, as shown and described in said former application.

Compressed air will flow also, although in a small quantity, through by-pass 99 having a reduced passageway at 100 to the under side of ball valve 103 to pipe 104 to rear door engine operator 62$^a$, to open the rear door, not shown.

Valve casing 96, which contains movable piston valve 110 and differential check valve 111, although any well known feed valve may be substituted in place of differential check valve 111, is to conserve the air pressure required to operate the system and to prevent an emergency application of the brakes upon release of controller handle 90, if a predetermined pressure has been built up already in brake cylinder 12. Casing 96 is equipped with two or more port holes 112, 112, opening to atmosphere. Movable piston valve 110 has formed in one end an open chamber 115 and a passageway for the projecting end 116 of differential check valve 111. End 116 is grooved at 117 to permit the passage of compressed air from chamber 115 to chamber 118 and to port 119 in valve 110 to chamber 120 of casing 96 on the side of valve 110 beyond chamber 115. Chamber 120 is connected to straight air pipe 5 by pipe 121.

Movable piston valve 110 is held to seat 122 by a small pressure in chamber 120 against a higher pressure entering by way of pipe 95 because of the difference in size of the diameters of the respective chamber 120 of casing 96 and chamber 115 of valve 110.

Moreover, piston valve 110 carries therein said differential check valve 111 which is held seated at 125 by spring 126. The tension of spring 126 is adjusted to allow compressed air to force valve 111 from its seat 125, whenever the difference of pressure in chamber 115 from chamber 120 is sufficient to overcome the adjusted tension of spring 126.

The operation of the system is effected by first starting the air pump, not shown, which forces compressed air into main reservoir 1. The operator should press down now on handle 90. As the pressure builds up in the system, it will flow also through pipe 3 to protection valve casing 20 to chamber 22ª formed in the end of movable piston valve 22. When this pressure in chamber 22ª has reached the predetermined pressure at which spring 24 is adjusted, piston valve 22 will be forced from seat 23 to seat 39, thus closing pipe 26 to atmosphere and connecting pipe 3 through chamber 22ª in casing 20 to pipe 35, to emergency tank 36, pipe 37, port 38, where it divides, part going by way of port 40 to chamber 41 above piston valve 10 and part going by way of port 42, that has reducing bushing 43, therein, to chamber 41 below piston valve 10 and thence to passageway 64 to pipe 30 to pilot valve casing 65 to chamber 72 therein. If handle 90 is in lower position, passage to chamber 73 is closed.

The pressure will pass also from chamber 41 in emergency valve casing 6 by way of pipes 54 and 55 to tank 56 and thence through pipes 55 to pipe 55ᴬ to door engines 60 and 61 to close the doors, not shown, if not already closed. The car is ready then for operation. However, should the operator start the car before sufficient pressure is built up in the system to force piston valve 22 to seat 39, the brakes may be applied by manipulating handle 15 to application position, thereby, connecting main reservoir pipe 3 to straight air pipe 5, so that the direction of the air pressure will be from main reservoir 1 to pipe 3, brake valve 2, pipe 5 to port 7 formed in the upper part 8 of movable piston valve 10 to pipe 11 to brake cylinder 12 thus applying the brakes. Although, in this instance, the passage through recharge check valve 33 is ported to atmosphere, reducing bushing 34 being relatively small will retard the escape of air pressure sufficiently to allow for the application of the brakes.

Furthermore, since the pressure has built up on both sides of piston valve 10 the same will remain in full line position as illustrated and the brakes can be applied or released from brake valve handle 15 as heretofore explained.

Operator by now applying the brakes from handle 15 will bring the car to a stop. In doing this, most of the pressure in brake cylinder 12 and pipe 5 will be exhausted, if a smooth stop is effected, and, yet, sufficient pressure will be retained to hold the car stationary. By now leaving brake valve handle 15 in lap position, with all ports closed, thereby, closing pipe 5, the small amount of pressure left in pipe 5 and chamber 120 of valve casing 96 will hold piston valve 110 on seat 122 even though full reservoir pressure is applied by way of pipe 95 and chamber 115. If now, with piston 110 on seat 122, operator releases handle 90, thereby, allowing compressed air to flow from chamber 72 to chamber 73, to port 91ª to passageway 97 to pipe 98 to front door engine operator 62, whereby to actuate said front door, not shown, to open position. The pressure will flow also up by ball valve 92 to chamber 93 thereabove to by-pass 99 to pipe 104 to rear door engine operator 62ª to open the rear door, not shown. The pressure will flow also through port 94 to pipe 95 to valve casing 96 to chamber 115 in valve 110. As piston valve 110 is held on seat 122, the pressure will build up door operating pipes 98 and 104, whereby to move the pistons of operators 62 and 62ª outward to open the doors, as fully set forth in said former application.

Handle 15 of brake valve 2 being still in lap position, with all ports closed, no pressure will be supplied to pipe 5. However, this pressure in pipe 5 will be built up and maintained from pipe 95 through differential check valve 111, whenever, the difference in pressure between chamber 120 on the far side of movable piston valve 110 and chamber 115 in valve 110 falls below that at which spring 126 is adjusted. Inasmuch, as passageways 97 and 100 are small and the rate of flow through port 119 in valve 110 is low, bushing 43 in emergency casing 6 is of such size that it will supply sufficient pressure to chamber 41 below emergency valve 10, port 64, pipe 30 to maintain a given pressure in chamber 41 below valve 10, whereby this same pressure together with the tension of spring 47 will hold piston valve 10 in full line position shown to prevent an emergency application of the brakes.

If handle 90 is pressed down, now, piston valve 66 will shut off the supply of compressed air to chamber 73 and will vent said chamber 73 to atmosphere by way of the groove 81 in plunger 76, thereby, allowing the pressure in pipe 98 to flow back through reduced passageway 97 to port 91ª to chamber 73 to chamber 74 to atmosphere to close the front door. In this instance, pressure in pipe 104 will be maintained to hold open rear door, as ball check valve 92 prevents the pressure from flowing therepast to channel 91ª. Any leakage is supplied through bushing 106 to pipe 104, as explained in said former application.

When the operator moves handle 15 of brake valve 2 to release position to release the brakes, air pressure will be exhausted from pipe 5 and chamber 120 of valve casing 96, thereby allowing the pressure in chamber 115 to force piston valve 110 off from seat 122 and allow compressed air to flow from pipe 95 to atmosphere, thereby exhausting the compressed air from pipe 104 by way of ball valve 103 to pipe 95 to casing 96 to holes 112 to atmosphere, whereby to close the rear door.

Should the operator release handle 90, while operating the car, without first applying the brakes and should there be no pressure in chamber 120, compressed air will be free to pass through pipe 30, chamber 72 of pilot valve casing 65, chamber 73, passageway 91ª, ball valve 92, by-pass 94, pipe 95, chamber 115 formed in valve casing 96, ports 112 to atmosphere. Since this rate of flow is high when compared to the amount of pressure that can pass through reducing bushing 43 of emergency valve casing 6, the pressure in chamber 41 under piston 10 will be reduced to such a degree, that the pressure thereabove will overcome the combined pressure and tension of spring 47, whereby, to force piston 10 to lower seat 46 to effect an emergency application of the brakes. In this lower position of valve 10, the pipe 11 will be connected then directly to chamber 41 of emergency valve casing 6, whereby full reservoir pressure will be applied to brake cylinder 12. Moreover, pipe 54 will be in communication with pipe 51 by port 50, thereby allowing the pressure to flow from tank 56 through pipe 54 to port 50 to pipe 51 to electric circuit knock off engine 52ª to pipe 53 to cut off the electric power and to sand the rails. Immediately the pressure in tank 56 has reduced itself sufficiently, the doors, not shown, of the car will be balanced and may be pushed open thereafter. The same result will obtain if the operator after opening the doors, moves brake valve handle 15 to release position before pressing down on pilot handle 90.

When the emergency valve 10 is on seat 46, port or by-pass 42 opens into chamber 41 above piston valve 10, whereby the pressure on top of piston valve 10 is main reservoir pressure, whereas chamber 41 below piston valve 10 is ported to atmosphere by way of pipe 30, chamber 72 in pilot valve casing 65, chamber 73, passageway 91ª, past ball valve 92, chamber 93, by-pass 94, pipe 95, chamber 120 of valve casing 96, port holes 112 to atmosphere. In order to cause spring 47 to force piston valve 10 up against stop 45 to release the brakes, it is necessary to build pressure up in chamber 41 below piston valve 10 to nearly reservoir pressure. This is accomplished by first pressing down on pilot valve handle 90 and then moving brake valve handle 15 to application position, whereby, pressure is free to flow main reservoir pipe 3, brake valve 2, pipe 5, bushing 34, one way check valve 33 to pipe 26, to pipe 29 to pipe 30, port 64 to chamber 41 below piston valve 10. Immediately this pressure has been built up to nearly reservoir pressure, spring 47 will force piston valve 10 up to full line position shown, whereby to connect pipe 11 of brake cylinder 12 to pipe 5 to permit the pressure in said brake cylinder 12 to exhaust to atmosphere in order to release the brakes when brake valve handle 15 is turned to release position. Port 42 being now below piston valve 10 the compressed air will maintain the required pressure in chamber 41, whereby to allow spring 47 to hold valve 10 in up position against stop 45.

Whenever the pressure in main reservoir 1, pipe 3, port 21 and chamber 28 of valve casing 20 on nonspring side of piston falls below a predetermined degree at which spring 24 is adjusted, piston 22 will be forced by said spring 24 from seat 39 to seat 23, thus porting pipe 26 to atmosphere through port 25, whereby to allow the pressure to flow from chamber 41 beneath piston valve 10 faster than it is supplied by way of reducing bushing 43. This will result in an emergency application of the brakes in the same manner as when handle 90 is released.

In order to again release the brakes, as pipe 26 now flows to atmosphere and the pressure supplied through bushing 34 can flow also to atmosphere, it is necessary to exhaust the pressure in emergency tank 36, which can be effected by opening cock 130 or by building up pressure in main reservoir 1 sufficiently to overcome spring tension on piston valve 22 to force it to seat 39, thus closing port 25 to atmosphere, whereupon the brakes can be released as heretofore described.

Having thus described my invention what

I claim as new and desire to secure by Letters Patent is:

1. In a fluid pressure brake for electric cars, an emergency valve, an emergency reservoir adapted for supplying fluid under pressure to said emergency valve, a main reservoir, means for supplying fluid under pressure to said emergency reservoir from said main reservoir, and means for conserving the pressure in said system.

2. In a fluid pressure brake for electric cars, an emergency valve, an emergency reservoir adapted for supplying fluid under pressure to said emergency valve, a main reservoir, means for supplying fluid under pressure to said emergency reservoir from said main reservoir, when pressure in the main reservoir is above a predetermined degree, and means for stopping this supply of fluid under pressure when the pressure in main reservoir falls below some predetermined degree.

3. In a fluid pressure brake for electric cars, an emergency valve for effecting an emergency application of the brakes, an emergency reservoir for supplying pressure to said emergency valve to operate said brakes, a main reservoir, means for supplying pressure to said emergency reservoir from the main reservoir, when the pressure in said main reservoir is above a predetermined degree, and means for stopping this supply and for effecting an emergency application of the brakes when the pressure in main reservoir falls below a predetermined degree.

4. In a fluid pressure brake for electric cars, means for automatically applying the brakes, a brake cylinder, means for preventing the automatic application of the brakes by an application of predetermined pressure, and means for building up pressure in said brake cylinder to a predetermined pressure.

5. In a fluid pressure brake for electric cars, a spring pressed pilot valve handle for automatically applying the brakes of the car, a valve for preventing this automatic application of the brakes, by a brake application of a predetermined pressure, a brake cylinder, and means for building up and maintaining pressure in brake cylinder at another predetermined pressure upon release of said pilot valve handle.

6. In a fluid pressure brake for electric cars, a spring pressed pilot valve for automatically applying the brakes of the car, when manual pressure is removed from the same, a valve for preventing this automatic application of the brakes, a brake cylinder, and a feed valve for building up and maintaining a predetermined pressure in said brake cylinder upon release of said pilot handle.

7. In a fluid pressure brake for electric cars, a brake cylinder, an emergency pipe, a valve for controlling the pressure in said emergency pipe, and means for operating the doors of the car by pressure in the emergency pipe.

8. In a fluid pressure brake for electric cars, an emergency pipe, means for controlling pressure in the emergency pipe, and means, whereby the pressure in the emergency pipe will maintain a suitable pressure in brake cylinder.

9. In a fluid pressure brake for electric cars, a brake cylinder, an emergency pipe, a valve for controlling the pressure in said emergency pipe, and for maintaining a suitable pressure in said brake cylinder.

10. In a fluid pressure brake for electric cars, a brake cylinder, an emergency pipe, a valve for controlling the pressure in the emergency pipe, and for maintaining a suitable pressure in the brake cylinder, and means for operating the doors of the car by pressure in the emergency pipe.

11. In a fluid pressure brake for electric cars, having a brake cylinder, an emergency pipe, a valve for controlling the pressure in said emergency pipe, whereby to effect an emergency application of the brakes, a straight air pipe adapted to be connected to said brake cylinder, a pilot valve adapted to vent pressure from said emergency air pipe, means for controlling the pressure in said emergency pipe, whereby to prevent an emergency application of the brakes, and to maintain a predetermined pressure in said straight air pipe upon release of said pilot valve.

12. In a fluid pressure brake for electric cars, an emergency valve casing containing a valve, a pipe leading from said casing, a brake cylinder connected to said pipe, said emergency valve adapted to effect an emergency application of the brakes, upon a reduction in emergency pipe pressure, a straight air pipe adapted to be connected to said brake cylinder, a pilot valve controlled by a controller handle, whereby to vent pressure from the emergency pipe upon release of said controller handle, another valve for controlling the pressure in the emergency pipe, whereby to prevent an emergency application of the brakes, and said valve adapted for maintaining a suitable pressure in the straight air pipe upon release of said controller handle.

13. In a fluid pressure brake for electric cars, an emergency pipe, a valve for controlling pressure in said pipe, whereby to effect an emergency application of the brakes, door operating motors, a pilot valve controlled by a spring actuated handle, whereby to vent pressure from said emergency pipe, a straight air pipe, means for effecting a pressure in said straight air pipe, whereby to prevent an emergency application of the brakes, means for maintaining a predetermined pressure in said straight air pipe, upon release of said pilot controller handle, door operating motors, and pressure means for operating said motors synchronously, whereby to actuate the doors.

14. In a fluid pressure brake for electric cars, having an emergency pipe, a valve for controlling pressure in said pipe, whereby to effect an emergency application of the brakes, a straight air pipe, whereby to effect a direct application of the brakes, a pilot valve actuated by a controller handle, whereby the release of said handle will actuate the pilot valve to vent pressure from the emergency pipe, means whereby a pressure in the straight air pipe will control pressure in the emergency pipe to prevent an emergency application of the brakes and said last named means adapted for building up and maintaining a predetermined pressure in said straight air pipe upon release of said controller handle.

15. In a fluid pressure brake for electric cars, an emergency pipe, an emergency valve, whereby a reduction in pressure in said pipe will effect an emergency application of the brakes, a straight air pipe, a pilot valve governed by a power controller handle, whereby to vent pressure from the emergency pipe, another valve, whereby the pressure in the emergency pipe will be controlled by pressure in straight air pipe to prevent an emergency application of the brakes, and said valve adapted for building up and maintaining a predetermined pressure in the straight air pipe upon release of said power controller handle.

16. In a fluid pressure brake for electric cars, having a power controller handle, an emergency pipe, a brake cylinder, a valve for controlling the admission and escape of pressure to said cylinder, whereby a reduction in pressure in said emergency pipe will effect an emergency application of the brakes, a straight air pipe, a pilot valve actuated by the power controller handle, whereby the release of the power controller handle will vent pressure from said emergency pipe, another valve for controlling the pressure in the emergency pipe, whereby to prevent an emergency application of the brakes, and a third valve for building up and maintaining a predetermined pressure in said straight air pipe upon release of said power controller handle.

17. In a fluid pressure brake for electric cars having a power controller handle, a brake cylinder, an emergency air pipe, an emergency valve adapted to be governed by pressure in said pipe, whereby a reduction in pressure in said pipe will effect an emergency application of the brakes, a straight air pipe, a second valve actuated by said power controller handle, whereby the release of said power controller handle will vent pressure from said emergency pipe, a third valve for controlling the pressure in said emergency pipe, whereby to prevent an emergency application of the brakes, and a fourth valve for building up and maintaining a predetermined pressure in said straight air pipe upon release of the power controller handle.

18. In a fluid pressure brake for electric cars having a power controller handle, an emergency valve adapted to effect an emergency application of the brakes, a straight air pipe for effecting a direct application of the brakes, a second valve for automatically applying the brakes when the pressure in said system falls below a predetermined level, and means for conserving the pressure in said system.

19. In a fluid pressure brake for electric cars, having a power controller handle, an emergency valve adapted to effect an emergency application of the brakes, a straight air pipe for effecting a direct application of the brakes, a second valve for automatically applying the brakes when pressure in said system falls below a predetermined level, and a third valve for conserving the pressure in said system.

20. In a fluid pressure brake for electric cars, having a power controller handle, an emergency valve adapted to effect an emergency application of the brakes, a straight air pipe for effecting a direct application of the brakes, means for automatically applying the brakes when the pressure in said system falls below a predetermined level, and other means for conserving the pressure in said system.

21. In a fluid pressure brake system for electric cars, automatic means for applying the brakes and a piston valve for conserving the pressure in said system.

In testimony whereof I have affixed my signature.

HARRISON S. SWEET.